Patented June 20, 1933

1,915,054

UNITED STATES PATENT OFFICE

MAX ENGELMANN, OF WILMINGTON, DELAWARE, ASSIGNOR TO E. I. DU PONT DE NEMOURS & COMPANY, OF WILMINGTON, DELAWARE, A CORPORATION OF DELAWARE

SEED DISINFECTANT

No Drawing. Application filed February 2, 1928. Serial No. 251,462.

This invention relates to materials suitable for use as disinfectants for the control of seed and plant diseases, and especially to materials of such character that they may be readily used in the dry state by a dusting process. Particularly, the invention has to do with compositions that depend for their disinfecting power upon relatively water-insoluble inorganic mercury compounds.

In the past, inorganic mercury compounds that have been used as the active agent in disinfecting compositions for seeds and plants, have been soluble in water, and it has been supposed that a relatively high degree of solubility was necessary in order that such compositions should be effective. I have now discovered, however, that insoluble inorganic mercury compounds, especially when they are finely ground, have, in spite of their insolubility in water, an effectiveness against the diseases of plants and seeds that is quite comparable in magnitude with that which has hitherto been attributed only to the soluble compounds, while at the same time they have certain advantages because of their insolubility, particularly in that they are not easily washed away from the point of application.

As examples of these compounds I mention metallic mercury itself, mercuric oxide, and the insoluble salts, such for example as calomel, mercurous nitrate, basic mercuric sulfate, basic mercuric nitrate, etc. Not all of these compounds are equally effective but all exhibit a marked effect in the control of disease. These materials may be diluted, and ordinarily are diluted with inert materials such for example as calcium sulfate kaolin, sulfur, calcium carbonate, or the like.

The active mercury compound may be simply mixed with the inert ingredient or it may be produced thereon as will be shown by the following illustrative examples:

Example 1

95 parts of hydrated lime are suspended in 500 parts of water and to this is added a solution of 5 parts of mercuric chloride. Mercuric oxide is formed and deposited on the lime. The product is filtered off and dried, and is then suitable for use as a dust disinfectant.

Example 2

The procedure shown in Example 1 is followed up to the point of the precipitation of the mercuric oxide on the lime. 5 parts of a 30% formaldehyde solution are then added with stirring. The mercuric oxide is reduced to metallic mercury, which remains as a black deposit on the particles of lime. This material is then filtered off and dried, and is then suitable for use as a disinfectant.

The product may be dusted on seeds for the control of disease or the seeds may be exposed to the vapor of metallic mercury which is gradually given off by this composition. Furthermore, metallic mercury may be used without dilution by placing it in such a way that its vapors come in contact with the products to be disinfected. This has been found also to be very effective in the control of disease under suitable conditions.

Example 3

10 parts of calomel are mixed intimately with 90 parts of finely divided clay. This may be carried out in a ball mill or in any other suitable device for thorough mixing.

Example 4

97 parts of infusorial earth are suspended in water and to this is added, with stirring, 3 parts of mercuric sulfate. The basic sulfate forms as an insoluble precipitate. The mixture is then filtered off and dried.

Example 5

96 parts of charcoal are suspended in water and to this is added a solution of 4 parts of mercuric acetate. After thorough mixing there is added to this the theoretical quantity of potassium iodide to form the normal mercuric iodide, which precipitates as a red insoluble precipitate. The mixture is then filtered and dried.

Example 6

Calomel is ground to a very fine powder and as such may be dusted on plants and seeds for the control of disease.

We have shown above how these disinfectants may be made, either by obtaining the pure mercury compound in finely divided condition or by mixing by any means compositions containing the mercury compound together with finely divided diluents, in which case the mercury compound may either be simply mixed with a diluent or coated on it.

By the expressions "water insoluble" and "relatively water-insoluble" as applied to our new compositions, we mean a degree of solubility such as that possessed by material which will not dissolve completely in 100 times its weight of water at 15° C.

Where in the claims we speak of an inorganic mercury compound we mean to include also metallic mercury, as shown in the specification.

As many apparently widely different embodiments of this invention may be made without departing from the spirit thereof, it is to be understood that I do not intend to limit myself to the specific embodiments thereof except as indicated in the appended claims.

I claim:

1. A disinfecting agent for controlling seed and plant diseases, comprising a diluent having deposited thereon a water-insoluble inorganic iodide free mercury compound.

2. A disinfecting agent for controlling seed and plant diseases, comprising a diluent having deposited thereon a finely divided water-insoluble inorganic iodide free mercury compound.

3. A disinfecting agent for controlling seed and plant diseases, comprising a diluent having deposited thereon water-insoluble inorganic iodide free mercury salts.

4. A disinfecting agent in dust form for controlling seed and plant diseases, comprises mercurous chloride, and a diluent.

5. A disinfecting agent in dust form for controlling seed and plant diseases, comprising finely divided mercurous chloride, and a diluent.

6. A disinfecting agent for controlling seed and plant diseases comprises as its principal active ingredient metallic mercury.

7. A disinfecting agent for controlling seed and plant diseases comprising metallic mercury and a diluent.

8. A disinfecting agent for controlling seed and plant diseases comprising a diluent having deposited thereon metallic mercury.

9. The herein described process of disinfecting corn and like seeds consisting in dusting the same with finely divided particles containing oxide of mercury.

10. The herein described process of disinfecting corn and like seeds comprising dusting the same with finely divided particles of inert matter admixed with yellow oxide of mercury.

11. The herein described process of disinfecting corn and like seeds consisting in dusting the seeds with finely divided particles of solid inert carrier comprising graphite, admixed with oxide of mercury.

12. The herein described finely powdered disinfectant for corn and like seeds comprising a solid inert carrier and an oxide of mercury.

13. The herein described finely pulverized disinfectant for corn and like seeds containing a solid inert carrier and yellow oxide of mercury in proportion to supply at least 2.5% mercury.

14. The herein described finely powdered disinfectant for corn and like seeds consisting of a solid inert carrier and yellow oxide of mercury in proportion to supply 8 to 10% mercury.

15. The herein described finely powdered disinfectant for corn and like seeds consisting of a solid inert carrier comprising graphite and an oxide of mercury.

16. Seeds superficially associated with a solid, water-insoluble inert carrier intermingled with an oxide of mercury.

17. Seeds superficially associated with a solid inert carrier intermingled with yellow oxide of mercury.

In testimony whereof, I affix my signature.

MAX ENGELMANN.